United States Patent [19]

O'Neill

[11] B 3,914,557

[45] Oct. 21, 1975

[54] MULTIFREQUENCY TONE DETECTING ARRANGEMENT

[75] Inventor: John Francis O'Neill, Boulder, Colo.

[73] Assignee: Bell Telephone Laboratories, Incorporated, Murray Hill, N.J.

[22] Filed: Apr. 11, 1973

[21] Appl. No.: 349,948

[44] Published under the Trial Voluntary Protest Program on January 28, 1975 as document no. B 349,948.

[52] U.S. Cl. .............................................. 179/84 VF

[51] Int. Cl.[2] ........................ H04M 1/50; H04Q 9/12

[58] Field of Search.................... 179/84 VF, 18 AD

[56] References Cited

UNITED STATES PATENTS

| | | | |
|---|---|---|---|
| 3,140,357 | 7/1964 | Bischof et al. | 179/84 VF |
| 3,582,565 | 6/1971 | Beeman et al. | 179/84 VF |
| 3,780,230 | 12/1973 | Bowen et al. | 179/84 VF |
| 3,795,775 | 3/1974 | Coupland | 179/84 VF |

*Primary Examiner*—Kathleen H. Claffy
*Assistant Examiner*—Joseph A. Popek
*Attorney, Agent, or Firm*—H. R. Popper

[57] ABSTRACT

A receiver for multifrequency call signals is disclosed which discriminates against the detection of any except a predetermined plurality of tone signals occurring in specified frequency bands. The detection is accomplished by a plurality of reasonator-amplifiers tuned to the specified frequencies each of which has a threshold controllable device at its output. The signals received by a group of the resonator-amplifiers are summed and the resultant signal, amplified to a predetermined amount, is applied to establish the threshold of the threshold controllable device. In one embodiment, the sampling signal is a summation signal developed from a group of the resonator-amplifiers tuned to a band of high frequency signals and this summation signal is amplified to establish the threshold for the group of resonator-amplifiers serving a band of lower frequency signals, and vice-versa. In this manner the cut-apart filter and instantaneous limiter circuits required by prior art arrangements are eliminated so that the instant receiver can be constructed without the use of numerous inductors required in a cut-apart filter.

12 Claims, 6 Drawing Figures

MULTIFREQUENCY TONE DETECTING ARRANGEMENT

BACKGROUND OF THE INVENTION

This invention relates to multifrequency call signaling and more particularly to an arrangement for receiving and detecting the presence of tone signals representing call signaling information.

L. A. Meacham et al in their prior art U.S. Pat. No. 3,076,059 issued Jan. 29, 1963 has shown a highly secure arrangement for detecting alternating current tones that is useful for call signaling in the voice frequency band. The tone signals required to be detected include one of a group of $m$ "high" frequency tones and one of a group of $n$ low frequency tones sent over the tip-and-ring conductors of the normal voice frequency transmission path. In that arrangement several precautions are taken to prevent the tone signal detectors from falsely responding to a component of speech frequency: the multifrequency tone generating telephone set is equipped to mute the speech input during the operation of the dialing oscillators, the signaling frequencies selected for use are nonharmonically related, and the two tones are required to be simultaneously present at the receiver for a finite predetermined interval. Thus, a stray audio band signal could be admitted to the signal receivers only during an interval just before the arrival of the first signaling digit and during the interdigit interval.

The prior art signal receiver consisted of several stages of detection. The receiver input included an emitter-follower buffer-amplifier to match the impedance of the incoming transmission line to the remainder of the circuit. Next, a high pass filter was used to attenuate dial tone. Next, a pair of band-separation filters were used to separate the frequency groups. Each band separation filter, whether of the bandpass or band-elimination type, was then followed by a nonlinear device known as an extreme instantaneous limiter. A single frequency can appear at the output of the limiter only if the amplitude of such frequency component in the input signal is stronger than that of all other frequency components combined. When so "captured," the output of the limiter is a square wave whose mean fundamental frequency is equal to the frequency of the dominant, i.e., highest level input signal.

The output of the limiter was coupled to an array of sharply tuned resonator-amplifiers. The resonator-amplifiers in turn were coupled through a logic arrangement to an array of register relays. When one such signal registering relay for the high frequency signaling band and one such relay for the low frequency signaling band is operated for a sufficient time, a valid signal condition is detected.

While the above-described detection arrangement is extremely reliable and satisfactory under the high noise ambient conditions to which the external telephone plant is sometimes subjected, the amount of discrimination exhibited may be more than is required under less severe operating conditions and consequently, the cost of the band-separation filters and of the extreme instantaneous limiters may not be warranted where a somewhat lower selectivity characteristic can be tolerated.

One such situation arises when the signal transmitted from the telephone set to the receiver is wholly within a single office building or business establishment as in the case of a PBX or electronic key telephone system where all of the telephones served are within a relatively short distance from the local switching apparatus. An example of such an electronic key system is disclosed in U.S. Pat. Nos. 3,787,631 issued on Jan. 22, 1974 to T. G. Lewis; 3,789,152 issued on Jan. 29, 1974 to D. G. Medill-J. F. O'Neill; and 3,789,154 issued on Jan. 29, 1974 to D. G. Medill which were copending with the present application and also in the copending application of J. O. Dimmick-L. P. Fabiano-T. G. Lewis-J. F. O'Neill Case 4-4-5-12 Ser. No. 313,956 filed Dec. 11, 1972. Because TOUCH-TONE receivers have been expensive to construct, there has been some reluctance by telephone companies to employ TOUCH-TONE signaling for the control of local switching apparatus where the cost of such apparatus cannot, as in the case of a central office receiver, be amortized over a large number of subscribers. In U.S. Pat. No. 3,701,854 issued Oct. 31, 1972, of H. P. Anderson-F. M. Fenton, for example, the TOUCH-TONE dial was required to be equipped with binary contacts to digitally encode the call signaling information thereby avoiding the expense of analog-type signal receivers. While that arrangement is suitable under certain circumstances, it would be desirable to provide a receiver capable of detecting the analog tones but which is less expensive than the arrangement shown in the above-mentioned Meacham et al. patent.

In analyzing the prior art Meacham et al. patent arrangement, I have concluded that an important part of the cost thereof lies in the dial tone removal and band separation or cut-apart filters, both of which require relatively large reactive components, and the instantaneous limiter. As is well known, it would be desirable to employ integrated circuit elements because of their lower cost, however, it has not yet been feasible to fabricate integrated circuit inductors and presently fabricatable integrated circuit capacitors suffer from wide tolerance variations. It is, accordingly, an object of my invention to provide a multiple tone signal detector which dispenses with the need for the input high pass and cut-apart filters and extreme limiters of the prior art thereby reducing the number of elements which cannot be built using integrated circuit techniques.

SUMMARY OF THE INVENTION

In accordance with my invention, in one illustrative embodiment thereof, the multiple tone signals are immediately applied by the input amplifier to the array of resonator-amplifiers without benefit of the dial tone or cut-apart filters or the nonlinear limiters. A circuit is connected to the outputs of a group of the resonator-amplifiers to develop a signal for establishing the threshold level of resonator-amplifier response. The variable threshold accommodates signal amplitude variations from loop length or from telephone tone source variation. In one embodiment of my invention, a threshold signal is developed from the output of the resonator-amplifiers serving the low group of signal frequencies and is used to modify the threshold response level of the group of resonator-amplifiers serving the high group of signal frequencies. Simultaneously, a sensing circuit connected to the group of high frequency resonator-amplifiers modifies the threshold for detection of the low band resonator-amplifers. This arrangement improves the capability of the invention to discriminate against speech signals.

In accordance with an aspect of my invention, the circuit which determines the resonator-amplifier threshold level may employ either the peak output determined by the most strongly responding one of the resonator-amplifiers in the group or it may employ the sum of the outputs of each of the resonator-amplifiers in the particular group.

BRIEF DESCRIPTION OF THE DRAWING

The foregoing and other objects of my invention may become more apparent from the ensuing description and drawing in which.

BACKGROUND OF THE PRIOR ART (FIG. 1)

Figure 1:
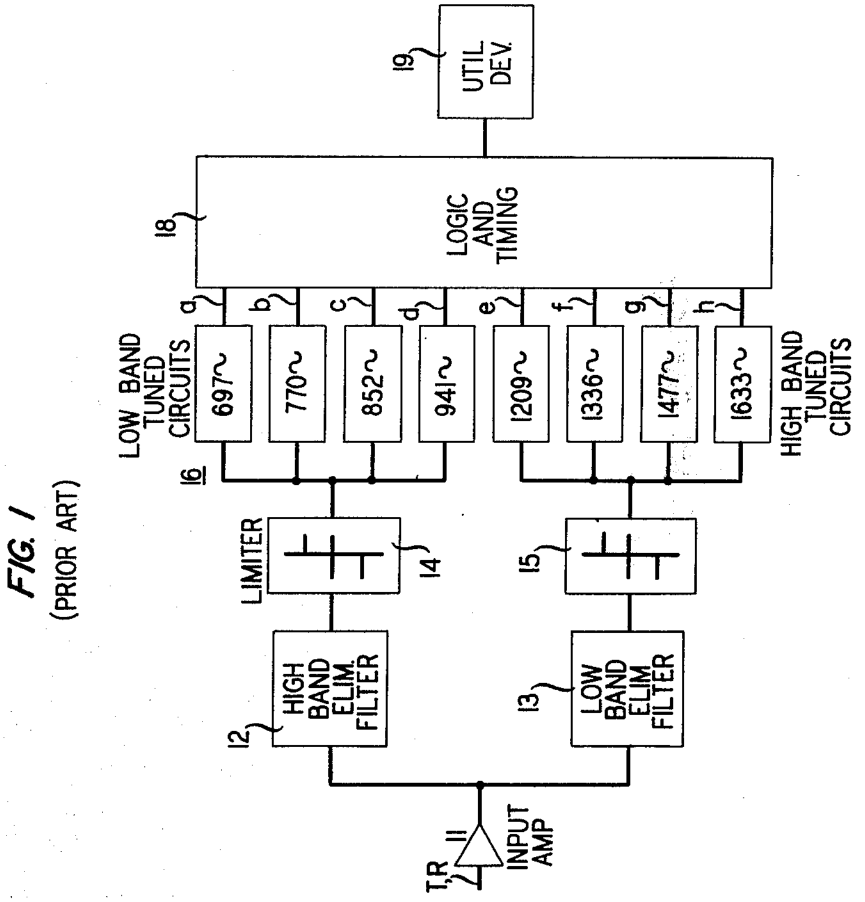
FIG. 1 (PRIOR ART)
FIG. 1 shows a prior art multifrequency tone receiver.

Referring now to FIG. 1, there is shown a prior art receiver of the type disclosed in the aforementioned L. A. Meacham et al. U.S. Pat. No. 3,076,059 patent. The description of this prior art circuit will not be belabored and only so many of the components as are necessary for an understanding of the basic operation will be described. Input buffer amplifier 11 is connected to the tip-and-ring conductors of the telephone line at the remote end of which (not shown) is a device, such as a telephone set equipped with pushbutton call signaling buttons for generating a pair of tone signaling frequencies of approximately equal amplitudes. Buffer amplifier 11 applies the received signals to band elimination filters 12 and 13. A simple high pass filter (not shown) may be inserted ahead of the band elimination filters to reduce dial tone to a non-interfering level. A band elimination filter is a well-known device which includes a plurality of coils and capacitors to achieve a predetermined band elimination characteristic. In the prior art Meacham et al. patent system, band elimination filter 12 had the characteristics such that the frequency band from approximately 1,209 Hz to 1,633 Hz would be eliminated but that the rest of the voice frequency band would be passed through. Band elimination filter 13 on the other hand would eliminate the low band of signaling frequencies from approximately 697 Hz to 941 Hz but would pass the rest of the audio band. Limiters 14 and 15 are nonlinear devices such that no one frequency will predominate at the outputs unless the amplitude of that frequency component is much greater than the amplitude of any other frequency component present at its input. The detailed characteristics of such nonlinear instantaneous limiters are described in the aforementioned L. A. Meacham et al. patent. Assuming a valid signal frequency is thus presented at the output of limiter 14, one of the group of low band tuned circuits 16 will respond to produce a valid-tone-present signal at one of outputs *a*, *b*, *c* or *d*. Likewise, assuming that limiter 15 presents a valid signal frequency at its output, one of the group of high band tuned circuits 17 will respond to produce a valid-tone-present signal at one of outputs *e*, *f*, *g* or *h*. Logic and timing circuit 18 contains logic for associating outputs *a* through *d* with outputs *e* through *h* such that a pair of outputs is required to operate a given registering relay, indicating lamp or other utilization means in utilization device 19.

The circuit of FIG. 1 operates with a high degree of precision and is extremely secure against false operation due to a surplus component of voice frequency. The circuit of FIG. 1 is, however, excessively costly for many applications for which tone signaling would otherwise be desirable, and has excess performance capability in those applications.

In accordance with my invention, the high pass dial tone filter, the band elimination filters 12 and 13 and the extreme instantaneous limiters 14 and 15 may be dispensed with. Buffer amplifier 11 applies the input signal directly to the inputs of the resonator amplifier arrays 16 and 17. In accordance with my invention the outputs of the resonator-amplifier arrays 16 and 17, in addition to driving the conventional logic and timing means 18 are now employed to develop a threshold control signal, the circuitry for which and the manner of operation for which will now hereinafter be described.

Figures 2, 3, 5, 6:
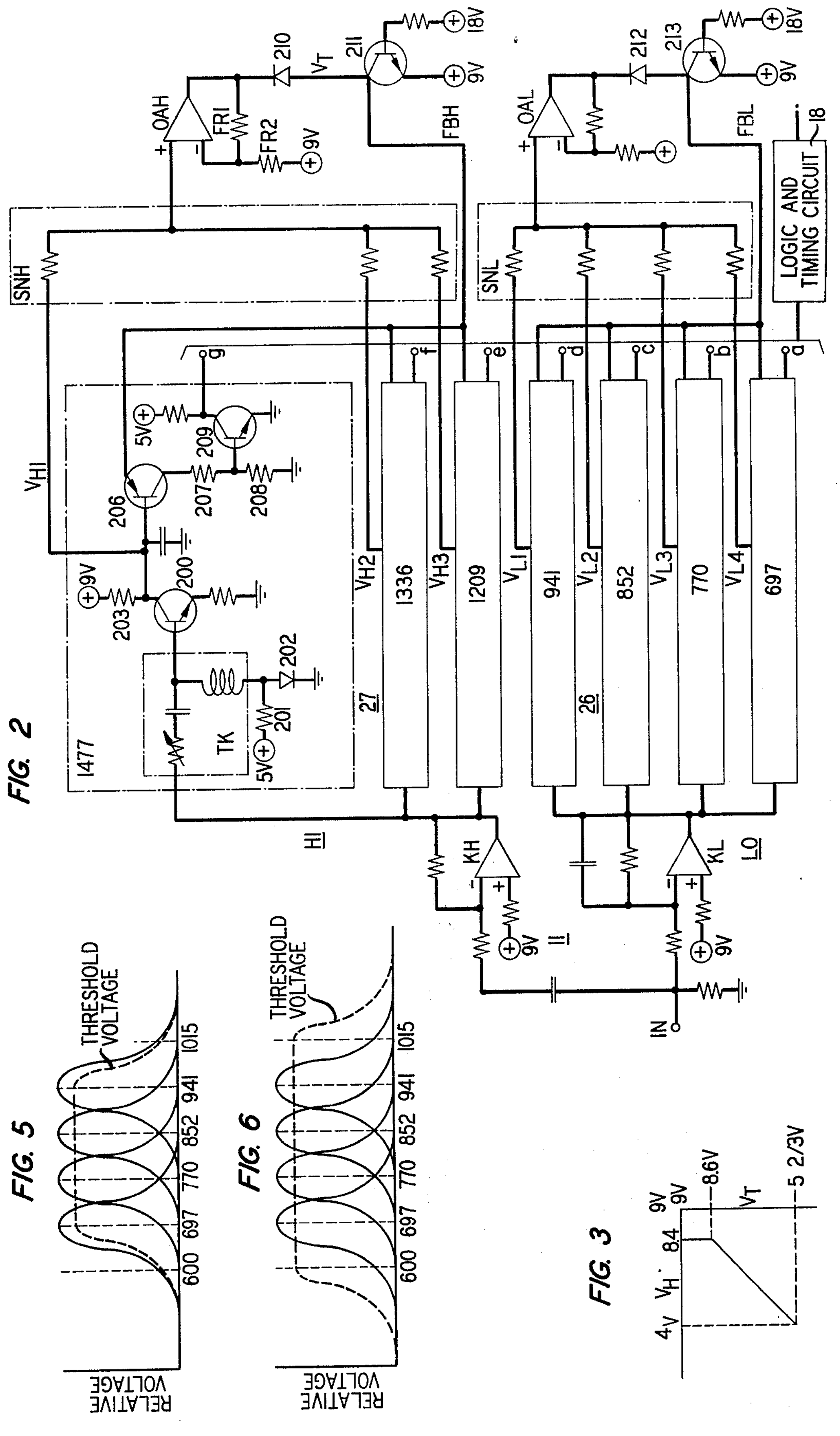
FIG. 2 shows one embodiment of a multifrequency receiver of my invention.
FIG. 3 shows a plot of the voltages at threshold control transistor 206.
FIG. 5 shows the frequency spectrum of the threshold voltage when only inband resonator-amplifiers are employed.
FIG. 6 shows the frequency spectrum of threshold voltage when out-of-signaling band resonator-amplifiers are added.

Description of FIG. 2

One embodiment of the receiver of my invention is shown in FIG. 2. In this arrangement an input buffer stage 11 is employed which advantageously may be quite similar to the input buffer amplifier 11 of FIG. 1. For the sake of convenience, however, I show the input stage as including an input buffer amplifier KH to drive the array of high frequency resonator-amplifiers 27 and a separate buffer amplifier KL to drive the array of low frequency resonator-amplifiers 26. These amplifiers may advantageously employ one capacitor each for high and low pass filtering to reduce the other band contact. The resonator-amplifiers of arrays 26 and 27 are identical except that each includes an individual tuned circuit TK especially tuned to respond to a specific one of the frequencies 1477, 1336, 1209 or 1633 for the high band of signaling frequencies in array 27 or 941, 852, 770 or 697 for the low band of frequencies in array 26. To simplify the drawing only one resonator-amplifier is shown in detail.

Each resonator-amplifier, such as the one detailed for 1,477 Hz signals, includes a transistor 200 whose base is connected to its respective, individually tuned tank TK. Transistor 200 is biased to operate in the linear portion of its characteristic by the 5-volt source, resistor 201 and diode 202. Advantageously, a single 5-volt source, dropping resistor 201 and a diode 202 could be employed to bias the bases of the input transistor 200 in each of the resonator-amplifiers of arrays 26 and 27. The diode drop compensates for the emitter-base drop of transistor 200 and, accordingly, transistor 200 will be placed into conduction in the linear region of operation by any magnitude output provided by tank TK. When transistor 200 is turned on, the current flow through collector supply resistor 203 causes the potential of output lead $V_{H1}$ to drop. For a collector supply battery of 9 volts and a resistor 203 of 30 kilohms a strong signal will cause the potential of lead $V_{H1}$ to drop by three or four volts while a weaker signal will drop the potential of lead $V_{H1}$ a lesser amount.

The signal appearing on output lead $V_{H1}$ of the 1,477 Hz resonator-amplifier is applied to the base of threshold transistor 206. Assuming that the output of buffer amplifier KH contains only a pure 1,477 Hz tone the other resonator-amplifiers of array 27 will produce only small output signals on their respective output leads $V_{H2}$ and $V_{H3}$. Under these circumstances, and as will hereinafter be more fully explained, the emitter of transistor 206 will be at a higher positive potential than its base and transistor 206 will conduct sufficiently to drive transistor 209 and apply a valid-tone-present output signal on output lead *g* to logic and timing circuit 18.

The signal developed at the collector of transistor 200 is also applied to lead $V_{H1}$ of sensing circuit SNH and by that circuit to the (+) input of operational amplifier OAH. The output of amplifier OAH drives diode 210 whose output, in turn, drives lead FBH which is connected to the emitter of threshold transistor 206 in the 1,477 Hz resonator-amplifier. The gain of amplifier OAH is adjusted to compensate for the attenuator introduced by sensing network SNH such that the drive applied to the emitter of transistor 206 will be less than that applied to its base. Diode 210 compensates for the base-emitter drop of the threshold transistor 206, thereby making the output of OAH directly comparable with the base drive of transistor 206. The transistor 211 clamps threshold lead FBH so that it cannot rise above +9 volts, thereby producing the small zero output segment of FIG. 3. Accordingly, for a pure 1,477 Hz tone applied to the input of 1,477 resonator-amplifier, the threshold-control circuitry comprising sensing circuit SNH, amplifier OAH, diode 210 and lead FBH will (except as hereinafter explained in FIG. 3) allow transistor 206 to conduct. Likewise if one only of the discrete frequencies 1,336 or 1,209 Hz is present its respective resonator-amplifier will have its own threshold transistor corresponding to transistor 206 rendered conductive by the signal which its discrete tone effects on threshold control lead FBH. In similar fashion the array 26 of low band resonator-amplifiers will be controlled by its respective sensing network SNL, amplifier OAL, diode 212 and threshold control lead FBL. Accordingly, a valid-tone-present signal will appear at one only of outputs *g*, *f*, *e* and at one only of outputs *d*, *c*, *b*, and *a*.

If, however, the signal delivered by buffer amplifier KH to array 27 is not precisely one only of the three discrete frequencies 1,477, 1,336 or 1,209 but lies somewhere in the range beween two of these signaling frequencies, say between 1,477 Hz and 1,336 Hz, the tuning response of tanks TK in each of the resonator-amplifiers for these frequencies is such that each will provide some output on its respective lead $V_{H1}$, $V_{H2}$. Let it be assumed for example that a spurious voice frequency of 1,400 Hz is present, the tanks of the 1,477 Hz and 1,336 Hz resonator-amplifiers will each respond somewhat to this signal even though each tank is rather sharply tuned to respond to its own discrete frequency. Each tank will accordingly apply some signal to the base of its respective transistor 200 and a signal of small magnitude, say one volt, will appear on lead $V_{H1}$ of the 1,477 Hz resonator-amplifier and a signal of one volt will appear on lead $V_{H2}$ of the 1,336 Hz resonator-amplifier. Sensing circuit SNH adds the two signals and applies the sum to the (+) input of amplifier OAH. Assuming that sensing network SNH contains three, 100 kilohm resistors, one in series with each of leads $V_{H1}$, $V_{H2}$ and $V_{H3}$, it is apparent that there is a 9-volt potential on lead $V_{H3}$ and 8-volt potentials on each of leads $V_{H1}$ and $V_{H2}$. Accordingly, the potential at the (+) input of amplifier OAH is approximately 8.33 V which amounts to a signal voltage of two-thirds of a volt. (In the prior example when only a pure 1,477 Hz tone signal was present which produced a 3- or 4-volt signal on lead $V_{H1}$, the voltage divider action of the resistors in sensing network SNH produced an effective signal voltage at the (+) input of amplifier OAH of approximately 1.0 or 1.33 volts, respectively.)

Assuming that the gain of amplifier OAH was priorly set at 2.0, the two-thirds of a volt input signal to amplifier OAH appears as a 1.33-volt signal at the OAH output, which has been shown to be directly comparable with the base input to transistor 206. This 1.33-volt signal is compared with the signal to transistor 206 in each of the 1,477 Hz and 1,336 Hz resonator-amplifiers. However, transistor 206 in each of these resonator-amplifiers has a signal voltage of one volt applied to its base and so the emitter voltage of each transistor 206 is fully back-biased. Accordingly, neither transistor 206 will provide any drive to its associated transistor 209 and accordingly no tone-present signal whatever will appear on outputs *g* or *f*.

If the spurious signal appearing on leads $V_{H1}$ and $V_{H2}$ was even larger than 1 volt, say 2 volts, two-thirds of this signal voltage or 1.33 volt would be applied to amplifier OAH and a signal of 2.67 V would be compared against the base voltage of transistor 206 in the 1,477 Hz and 1,336 Hz resonator-amplifiers. Accordingly, each transistor 206 will still be back-biased even for spurious signals of large amplitude.

As shown in FIG. 2, sensing circuits SNH and SNL are each resistor summing networks. Alternatively, network SNH could be configured out of diodes or transistors to apply only the peak signal or highest amplitude from any of the resonator-amplifiers of array 27 but for present purposes the summing network configuration is preferred.

Amplifier OAH is a noninverting operational amplifier which advantageously may be of conventional design. Feedback resistors FR1 and FR2 couple a portion of the output of amplifier OAH back to its (−) input terminal to provide negative feedback. The gain of amplifier OAH is adjusted such that the threshold voltage $V_T$ applied to diode 210 will be approximately two-thirds of the signal applied to lead $V_{H1}$. Thus, if the signal on lead $V_{H1}$ is a3-volt signal, the base of transistor 206 will be at +6 volts with respect to ground while the voltage $V_T$ on lead FBH applied to the emitter of transistor 206 will be a 2.0–0.7, or 1.3-volt signal, i.e., the emitter will be at a potential of +7.7 with respect to ground. In this event, since the emitter is more than 0.7 volt positive (with respect to ground) than the base of transistor 206 due to the applied signal, transistor 206 will conduct and a portion of its output voltage will drive transistor 209 which in turn will apply a digit-indicating signal over output lead *g* to logic timing circuit 18. In this manner, the single tone frequency applied by amplifier KH to the resonator-amplifier 1,477 Hz has been sensed at the collector of transistor 200 by circuit SNH and different circuits together with amplifier OAH and feedback threshold lead FBH has set the threshold for operation of transistor 206 such that a digit-indicating signal appears at output *g*.

The resonator-amplifiers of array 26 operate to detect one of the signal frequencies 941, 852, 770 or 697 in the low frequency band in similar fashion to that in which the resonators of array 27 operate to detect a signal in the high frequency signaling band. In the case of the resonators of array 26 the individual responses of the resonator-amplifiers apply to leads $V_{L1}$ through $V_{L4}$, are applied to sensing network SNL, therein summed, and thereafter employed by operational amplifier OAL to develop a feedback threshold voltage on lead FBL to establish the threshold of signal level detection by the resonator-amplifiers of array 26.

Accordingly, the arrangement of FIG. 2 is seen to contain a plurality of resonator-amplifiers the individual responses of a group of which are summed to establish a threshold signal level which level prevents a response by more than one of the resonator-amplifiers in the group and which prohibits a response from all of the resonator-amplifiers except when the only signal present is close to the signal to which one of the resonator-amplifiers is precisely tuned.

In FIG. 3 the voltage on a single $V_H$-lead of FIG. 2 is plotted against the effective threshold control voltage, which is the voltage on lead FBH minus one diode drop (0.7 V) or the output of OAH for the case when only a single pure tone of a discrete signaling frequency is present. For signals which may cause the normal 9.0-volt battery potential of lead $V_H$ to be reduced by 0.6 to 5.0 volts to 8.4 or 4.0 volts, respectively, amplifying characteristics of amplifier OAH are such that the threshold signal closely approximates the signal on lead $V_H$ but appropriately scaled smaller by about two-thirds. For input signals less than 0.6 volts on lead $V_H$ the clamp transistor 211 keeps diode 210 backbiased, the threshold voltage remains at about +9 volts, which maintains the emitter of transistor 206 at a potential less than 0.6 volts higher than its base and so transistor 206 is kept cut-off.

Figure 4:
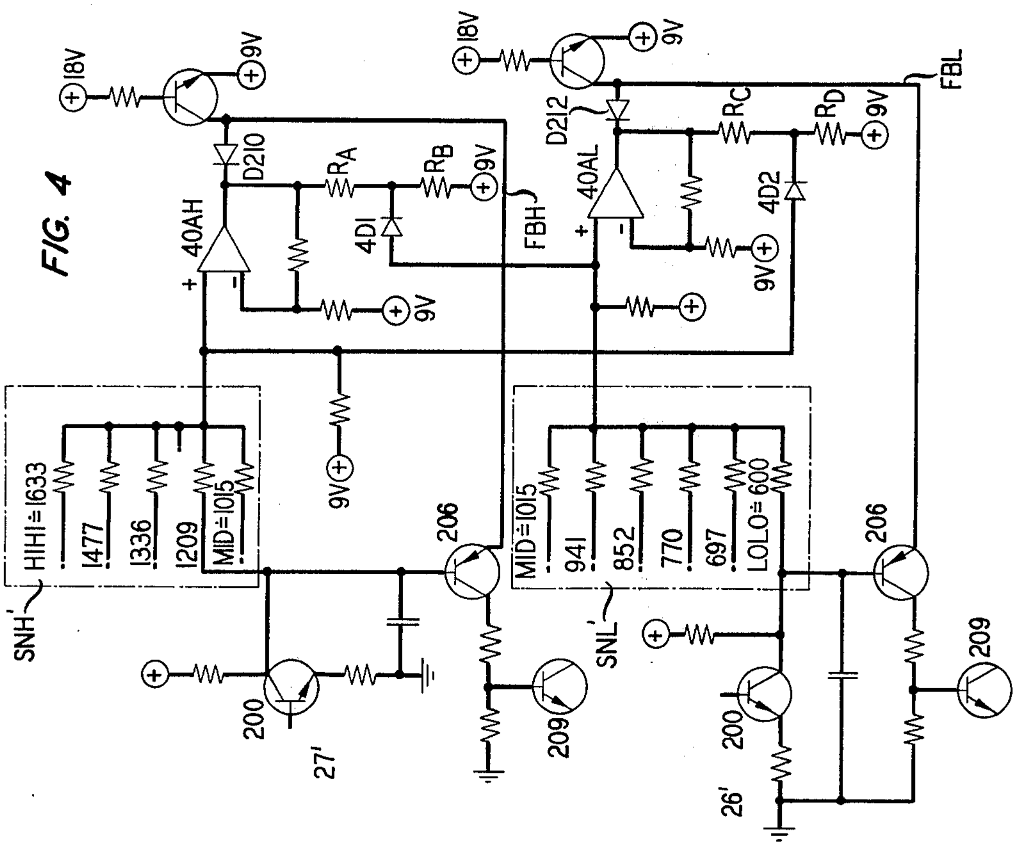
FIG. 4 shows an alternative embodiment of my multifrequency receiver employing cross-coupled amplifiers.

Cross-Coupled Detection Arrangement (FIG. 4)

In FIG. 4 an alternative signal receiver is shown which differs from the arrangement of FIG. 2 in two principal respects. One principal change is the cross coupling of the outputs of the operational amplifiers serving the high and low band resonator amplifiers. To simplify the figure only one resonator-amplifier has been shown for the high band array 27 and only one for the low band array 26 and these have been skeletonized. The summing networks SNH' and SNL' are similar to the similarly designated summing networks of FIG. 2 except that each includes additional summing resistors for inputs from additional resonator-amplifiers. Thus, summing network SNH' includes an additional summing resistor HIHI for a resonator-amplifier (not shown) tuned to an audio frequency above the highest frequency desired for normal signaling, say at 1,633 Hz. It also has an additional summing resistor MID for a resonator-amplifier (not shown) tuned to an audio frequency between the 941 and 1,209 frequencies, say 1,015 Hz amplifier and its corresponding summing resistor which were omitted from Fig. 2 to simplify the presentation of that figure. Summing network SNL' includes an additional summing resistor LOLO for resonator-amplifier 26' which is tuned to a frequency below the lowest frequency (697 Hz) normally used for signaling, say at 600 Hz. In addition, networks SNH' and SNL' may each include a summing resistor MID for applying an input from a resonator-amplifier (not shown) tuned to a frequency in the mid band between the lowest frequency (1,209 Hz) of the high band resonator-amplifiers and the highest frequency (941 Hz) of the low band resonator-amplifiers. The function of the additional resonator-amplifiers, of which only resonator amplifier 26', connected to lead LOLO is explicitly shown, and their associated summing resistors HIHI, MID and LOLO in each of summing networks SNH' and SNL' is to provide an increased threshold guard against spurious signals. The additional resonator-amplifiers associated with leads HIHI, MID and LOLO of course have no output to logic and timing circuit 18, and need not have transistors corresponding to 206 or 209.

Neglecting for the moment the function of the just-mentioned additional resonator-amplifiers, let it be assumed that the 1,209 Hz resonator-amplifier shown in skeleton form in FIG. 4 contributes a legitimate 3- or 4-volt signal into summing network SNH'. Assuming circuit SNH' to be a six-resistor summing network only one-sixth of the signal developed by a single transistor 200 collector is applied to the (+) input of amplifier 40AH. Accordingly, amplifier 40AH should be adjusted to have a gain of about 4 to provide proper threshold for transistor 206, namely two-thirds of the input. Amplifier 40AH adjusted to have a gain of 4, for example, produces a threshold a signal of 2.0 or 2.67 volts at its output which signal is less than the 3.0- or 4.0-volt signal at the base of transistor 206. Accordingly, transistor 206 conducts and would produce an output to logic and timing circuit 18 as in the case of the circuitry of FIG. 2. The circuit of FIG. 4 includes a feedback voltage divider RA, RB connected to the output of amplifier 40AH and a feedback divider RC, RD connected to the output of amplifier 40AL. Illustratively, resistor RB may have a value three-thirteenths of that of resistor RA and the value of resistor RD may be chosen to be three-thirteenths of resistor RC. Accordingly, the junction of the resistors RA and RB will undergo three-sixteenths of any potential changes produced at the output of amplifier 40AH and likewise the junction point of resistors RC and RD undergoes three-sixteenths of any potential change produced at the output of amplifier 40AC. The junction point of resistors RA and RB of the high band array is connected to the (+) input of amplifier 40AL of the low band array via a diode 4D1. Likewise, the junction of resistors RC and RD of the low band array is connected to the (+) input of amplifier 40AH of the high band array.

The circuitry operates in the following manner. Let it be assumed that a single pure tone of 1,477 Hz is presented to the high band array and that a single pure tone of 852 Hz is presented to the low band array and that the input signals due to these tones at amplifiers 40AH and 40AL is each 1 volt corresponding to a 6-volt signal (+3 volts from ground) at the base of transistor 206 in the resistor amplifier for 1,447 Hz and a similar signal at the base of transistor 206 in the resonator-amplifier for 852 Hz. The potential at the cathode of diode 4D2 is adjusted by dividers RC and RD so that it is at 0.75 volt. Accordingly, diode 4D2 is nonconductive. Diode 4D1 is similarly so adjusted and with close to the same magnitude tone signal applied to the high and low band arrays both diodes 4D1 and 4D2 are nonconductive. Let it be supposed, however, that the 1,447 Hz signal produces a 1-volt signal at the (+) input of amplifier 40AH but that the 852 Hz signal produces only a one-third volt signal at the input of amplifier 40AL. Such signals should not be accepted as a valid digit. The anode of diode 4D1 receives the 1-volt signal provided by the 852 Hz input to amplifier 40AL. However, the cathode of diode 4D1 receives three-sixteenths of the 4-volt change in the potential at the output of amplifier 40AH or three-fourths volt, which change is greater than the one-third volt change at the input of amplifier 40AL and so diode 4D1 is rendered conductive. Diode 4D1 becoming conductive has two effects.

The input to amplifier 40AL will receive an increased signal due to the conduction of diode 4D1. This signal will be reflected as an increased signal on lead FBL which is connected to the emitter of transistor 206 of the 852 Hz resonator-amplifier. However, the base of this transistor 206 is being driven by a signal of smaller amplitude and accordingly transistor 206 is cut off. Thus, the disparity in amplitudes of the 1447 signal and of the 852 Hz signal has caused the 852 Hz resonator-amplifier to have its threshold control transistor cut off thereby preventing this resonator-amplifier from providing any valid-tone-present signal to logic circuit 18.

The allowable discrepancy and amplitude between a valid-high-band-tone signal and a valid-low-band-tone signal that will allow each signal's resonator-amplifier to deliver an output is governed by the voltage divider ratios at the outputs of amplifiers 40AH and 40AL, the gain of these amplifiers and the attenuation introduced by the input summing network.

For example, assuming that summing networks SHN' and SNL' are each six-resistor summing networks, one resonator-amplifier set such as the one for 1,477 Hz delivers a signal to summing network SNH' only one-sixth of that signal appears at the (+) input of amplifier 40AH. The gain of amplifier 40AH can thus not exceed 6 or else transistor 206 will be back-biased even for a valid signal. If the gain of amplifiers 40AH is 4 then the signal provided to lead FBH and the emitter of transistor 206 will be two-thirds the signal presented to the base of this transistor and transistor 206 will be rendered conductive for a single-valid-tone signal.

To turn off transistor 206 in a resonator-amplifier of group 26 which receives too small an amplitude input signal compared to the signal received by a resonator-amplifier in group 27 requires that the feedback circuit deliver the emitter of the group 26 transistor 206 a larger signal than the signal applied to its base. Say it is desired to reject signals which differ in amplitude by more than 2-to-1, i.e., assume that the amplitude of the 852 Hz signal received in resonator-amplifier group 26 is half that of the amplitude of the 1,477 Hz signal received in group 27. The input to amplifier 40AL will be taken over by the conduction of diode 4D1 such that amplifier 40AL will lower the potential of the emitter of the 852 Hz transistor 206 as much or more than the potential on the base of this transistor is lowered by the 852 Hz signal itself. If amplifier 40AL has a gain of 4 and network SNL' attenuates by one-sixth the feedback signal on lead FBL causes the emitter of the 852 Hz transistor 206 to be lowered only two-thirds of the amount that the base is lowered by the 852 Hz signal itself. If diode 4D1 becomes conductive, it will replace the input of amplifier 40AL by the fraction $$RB/RA + RB$$

of the signal developed at the output of amplifier 40AH. The 1,477 Hz signal at the input of amplifier 40AH is assumed to be twice the amplitude of the 852 Hz signal present at the input of amplifier 40AL. In order that this (1,477 Hz) signal, amplified by the gain of amplifier 40AL, together with the amplified 852 Hz signal appear on lead FBL with the same magnitude as the 852 Hz signal on the base of the 852 Hz transistor 206, the following relationship must obtain:

$$K_L\ R_B R_A + R_B\ K_H \cdot 2S_L = 6S_L \qquad \text{(I)}$$

In equation I, $K_L$ is the gain of amplifier 40AL, $K_H$ is the gain of amplifier 40AH and $S_L$ is the amplitude of the 852 Hz signal at the input of amplifier 40AL. $R_A$ and $R_B$ must be much smaller than the parallel combination of the six input resistors to 40AL. The factor 6 in the above equation is necessitated by the fact that, (due to the attenuation of the other five resistors in sensing network SNL') the 852 Hz signal at the base of transistor 206 is six times the amplitude of the 852 Hz signal at the (+) input of amplifier 40AL. The factor 2 in the above equation occurs because it is assumed that the 1,477 Hz signal at the input of amplifier 40AH is twice the amplitude of the 852 Hz signal at the input of amplifier 40AL. Solving the above equation for the voltage divider ratio yields:

$$R_B/R_A + R_B = 6/2K^2 \qquad \text{(II)}$$

In formula II it has been assumed that the gain $K_H$ of amplifier 40AH is the same as the gain $K_L$ of amplifier 40AL. If the gain $K_L$=$K_H$ be set at 4 in equation II and if it be assumed that a 2:1 discrepancy in the amplitude of the high band and low band signals should just cut off the transistor 206 of the resonator-amplifier receiving the lower amplitude signal, equation II shows that the voltage divider ratio should be 3/16. If on the other hand a 3-to-1 amplitude discrepancy can be tolerated and the gain of the amplifiers is 4, the voltage divider ratio should be 118.

It was mentioned above that the arrangement of FIG. 4 differed in two principal respects from that of FIG. 2. The effect of the cross coupling of amplifiers OAH and OAL has been described. The other difference is the inclusion of additional summing resistors for frequency inputs above and below the band of signaling frequencies in each of arrays 26' and 27'. If these summing resistors apply out-of-band signals to the input of their respective amplifiers OAH or OAL, the effect is to extend the frequency range over which a minimum threshold level is effective so that these inputs that lie outside the band of signaling frequencies will be rejected. FIG. 5 shows the threshold voltage without the additional summing resistors and FIG. 6 shows the extended frequency range of the threshold voltage when the summing resistors are added.

The above analysis for the voltage divider ratio neglects the effect of the diode drop in the conducting ones of diodes 4D1 or 4D2. The diode voltage drop may be conveniently taken into account by adding diodes to each cross-coupling diode whose cathode is connected to the cathode of 4D1 (or 4D2) and whose anode is connected to the junction of $R_A$ and $R_B$ (or $R_B$ and $R_D$). A resistor to ground from the junction of the two cathodes then biases the circuit. This resistor in parallel with $R_B$ (or $R_D$) then replaces the value of $R_B$ (or $R_D$) in the previous calculation. The voltage drop across the added diode cancels the drop across 4D1 (or 4D2).

Accordingly it has been described as a multiple tone receiver that provides a threshold level for rejecting spurious tones whether they be off-frequency or of too wide an amplitude variation. Numerous other embodiments may be thought of by those skilled in the art without departing from the spirit and scope of the within-described invention.

What is claimed is:

1. An arrangement for discriminating against the detection of a signal in either of a first or second band of signal frequencies in the absence of a signal from the other band of signal frequencies, comprising

- a respective circuit for resonating in response to the occurrence of each signal in said first band of frequencies,
- a respective circuit for resonating in response to the occurrence of each signal in said second band of frequencies,
- a threshold sensitive device respective to each of said resonating circuits, and
- means for setting the threshold of the threshold sensitive device respective to each resonating circuit of said first band of frequencies in accordance with the signal amplitude of any of the signals of said second band of frequencies, said threshold setting means including means for sampling each resonating circuit from said first and said second band of frequencies to develop a respective summation signal whose amplitude is proportional to the sum of the outputs of each of said resonating circuits.

2. An arrangement for discriminating in accordance with claim 1, wherein said setting means includes means for detecting a signal having a frequency outside the band of said first and said second band of signal frequencies.

3. An arrangement according to claim 1 wherein each said threshold setting means comprises amplifier means connected between said sampling means and said threshold sensitive device respective to each said resonating circuit.

4. An arrangement according to claim 1 wherein said sampling means includes resistor summing means having a respective input resistor connected between each said resonating circuit and said amplifier means and wherein said amplifier means is adjusted to have a gain lower than that which will off-set the attenuation of said resistor summing means.

5. An arrangement for discriminating against the detection of a signal in either of a first or second band of signal frequencies when the signal in the second or first band of said frequencies has an amplitude more than *n* times the amplitude of the signal present in the first or second of said frequency bands comprising

- a respective circuit for resonating in response to the occurrence of each signal in said first band of frequencies,
- a respective circuit for resonating in response to the occurrence of each signal in said second band of frequencies,
- a threshold sensitive device respective to each of said resonating circuits, and
- means for setting the threshold of the threshold sensitive device respective to each resonating circuit of said first band of frequencies in accordance with the signal amplitude of any of signals of said second band of frequencies, said setting means including means for summing the outputs of said resonating circuit respective to each signal in said first and said second band of frequencies,
- means for amplifying the output of said summing means, and
- means for increasing the threshold of said threshold sensitive device when more than one signal of a predetermined amplitude occurs in either said first or said second band of frequencies.

6. An arrangement for discriminating against the detection of any but a predetermined number of discrete frequencies in a frequency band comprising

- a respective circuit tuned to resonate at each said discrete frequency,
- a threshold control device for each said tuned circuit,
- means for summing the outputs produced by each said tuned circuit, and
- means for delivering an amplified component of said summed signal to the threshold device in each said tuned circuit to cut off said threshold device in each said tuned circuit delivering an output of a frequency other than the frequency at which said circuit is discretely tuned to resonate.

7. An arrangement for detecting the simultaneous presence of a pair of signals in each of two bands of nonharmonically related signaling frequencies in the band of voice frequencies wherein each signaling frequency is detectable by a respective resonating circuit and in which a logic arrangement is connected to the output of each resonating circuit to decode the signaling path characterized in that the arrangement includes circuitry for discriminating against the detection of any signal when a signal from only one of the band of signaling frequencies is present comprising

- an operational amplifier connected between the output of each resonating circuit and the decoding logic circuit and a circuit for adjusting the threshold of the operational amplifier in accordance with the sum of the amplitudes of all signals present in one of the two bands of frequencies and the amplitude of any voice frequency present outside the two bands of frequencies.

8. An arrangement for detecting one of a plurality of permissible discrete tone signals, and for discriminating against the detection of any other tone in a predetermined band of frequencies comprising

- a respective circuit for resonating in response to the occurrence of each said discrete signal frequency,
- a circuit for sampling the output of each said resonating circuits to develop a control signal which is the sum of the amplitudes of the signal presented by each said resonating circuit,
- utilization circuit means,
- a respective threshold sensitive device connected between each said resonating circuit and said utilization device, and
- means for delivering said control signal from said sampling circuit to each said threshold sensitive device for establishing the minimum signal which must be present at any said resonating circuit output to be coupled to said utilization circuit means.

9. An arrangement for detecting a tone signal according to claim 8 wherein said threshold sensitive device comprises a transistor having its base signal supplied by a respective one of said resonating circuits and its emitter signal supplied by said sampling circuit control signal.

10. An arrangement for detecting a tone signal according to claim 9 wherein said sampling circuit includes an impedance summing circuit means having a respective element connected to each said resonating circuit at one end of each said element and to a common point at the other end and amplifier means connected between said common point and each said threshold sensitive device.

11. An arrangement for detecting a tone signal according to claim 10 wherein said amplifier means is adjusted to have a gain lower than that which will compensate for the attenuation introduced by said impedance circuit means.

12. An arrangement for detecting a tone signal according to claim 11 further comprising a respective circuit for resonating in response to the occurrence of each discrete signal frequency in a second frequency band, a second sampling circuit connected to the output of each resonating circuit for said second frequency band, said second circuit including second amplifier means having an input and an output, said second amplifier means output developing a second control signal, a respective threshold sensitive device connected between each said resonating circuit for said second frequency band and said utilization device, means for delivering a first fraction of the output of said second amplifying means to each said threshold sensitive device for said second frequency band and another fraction of said output to the amplifying means of said first-mentioned band of frequencies.

* * * * *